United States Patent [19]

Bóna

[11] Patent Number: 4,772,252

[45] Date of Patent: Sep. 20, 1988

[54] DRIVING GEAR FOR VEHICLES PARTICULARLY FOR BICYCLES

[75] Inventor: Gábor Bóna, Budapest, Hungary

[73] Assignee: Licencia Talalmanyokat Ertekesito es Innovacios Kulkereskedelmi Vallalat, Hungary

[21] Appl. No.: 944,669

[22] Filed: Dec. 19, 1986

[51] Int. Cl.[4] .............................................. F16H 7/10
[52] U.S. Cl. ....................................... 474/112; 74/69
[58] Field of Search .................. 474/112, 69, 72, 116; 74/69; 280/260, 261

[56] References Cited

U.S. PATENT DOCUMENTS 599,445  2/1898  Freeman ................................ 74/69

FOREIGN PATENT DOCUMENTS 636005  3/1928  France ................................. 74/69
901584  7/1945  France ................................. 74/69
4534  of 1884  United Kingdom ..................... 74/69

Primary Examiner—Stephen J. Novosad
Assistant Examiner—Thuy M. Bui
Attorney, Agent, or Firm—Handal & Morofsky

[57] ABSTRACT

The invention realizes fluent drive without dead points by continuously changing the angle between the levers (13,14) of the pedals (1). The two pedal levers (13,14) are fixed to two separate shafts (15,16) with common axis (3). The driving shaft (18) is eccentric to this axis (3) and the mechanical connection between the driving shaft (18) and the shafts (15,16) of the pedal levers (13,14) is realized by eccentrics (19,20). With this construction the pedals move faster when coming upwards and slower when going downwards, so when the depressed pedal reaches its lowest point, the other one has already passed its highest point.

3 Claims, 4 Drawing Sheets

DRIVING GEAR FOR VEHICLES PARTICULARLY FOR BICYCLES

FIELD AND BACKGROUND OF THE INVENTION

The present invention relates to a driving gear with two pedals fixed to pedal levers, rotating around a common axis and with a driving shaft, for bicycles or generally for vehicles driven by pedals.

There are many inventions aiming to improve conventional bicycle driving gear (two rotating pedals in opposite position). Most of these inventions try to eliminate or diminish the basic disadvantage of this gear, namely that there is a relatively short stage during the periodic motion when the depressed pedal moves in a favourable direction for the muscles of the leg. On conventional bicycles this direction is the downward pushing of the pedal, thus the effective stage is near to the horizontal position of the pedal. As this effective stage is relatively short (about ⅙ of the circle), the drive is pulsating, what is more, there are positions—so called dead points—when the depressing of neither of the pedals will result in forward drive.

Most of the improvements attempt to diminish the ineffective movements of the pedals (and of the legs), either by moving the pedals linearly up and down or by changing the length of the pedal levers. Another possibility is to alter the angular speed of the pedals according to their positions around the circle.

Because of their various disadvantages, these mechanisms could not gain ground, anyway, none of them could eliminate the dead points and the pulsating character of the drive.

SUMMARY AND OBJECTS OF THE INVENTION

Object of the present invention is therefore to eliminate the above disadvantages and to provide a driving gear without dead points, i.e. to achieve that the effective stages of the two pedals are practically adjacent. (By the time when one pedal reaches the end of the effective stage, the other reaches the beginning of the next one.)

According to the invention the axis of the pedal levers and the axis of the driving shaft are shifted with respect to each other and the pedal levers are connected to the driving shaft by eccentrics.

According to an embodiment, the eccentric member has a slotted lever fixed to the shaft of the pedal lever and another lever is fixed to the driving shaft and connected to the slot by a pin.

According to another embodiment, the shaft of one of the pedal levers is coaxially arranged in the tubular shaft of the other pedal lever, while the driving shaft is also tubular and the shafts of the pedal levers are inside it.

Yet an other practical embodiment is characterized by the fact that one of the eccentric members consists of a slotted lever fixed to the shaft of the pedal lever and of a pin fixed to the driving shaft and butted into the slot. The other eccentric member consists of a slot in the pedal lever and of a pin fixed to the driving shaft and butted into the slot.

There is yet another embodiment wherein the distance between the axis of the pedal levers and that of the driving shaft is adjustable.

As the invention can generally serve as a driving gear for bicycles, a chain-wheel may be fixed to the driving shaft.

The basic advantage of the invented gear is that it eliminates the simultaneous dead points of the pedals and by this it makes the drive more fluent and effective.

BRIEF DESCRIPTION OF THE DRAWINGS

These and other objects of this invention will be shown in the accompanying drawings in which.

DESCRIPTION OF THE PREFERRED EMBODIMENTS

Figure 2:
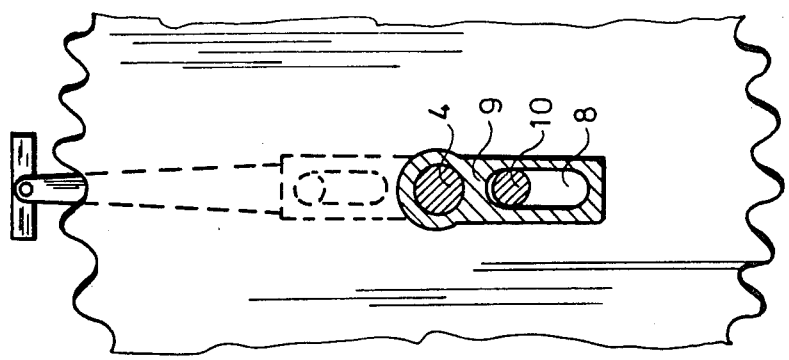
FIG. 2 is the section through the line II—II in FIG. 1.
Figure 1:
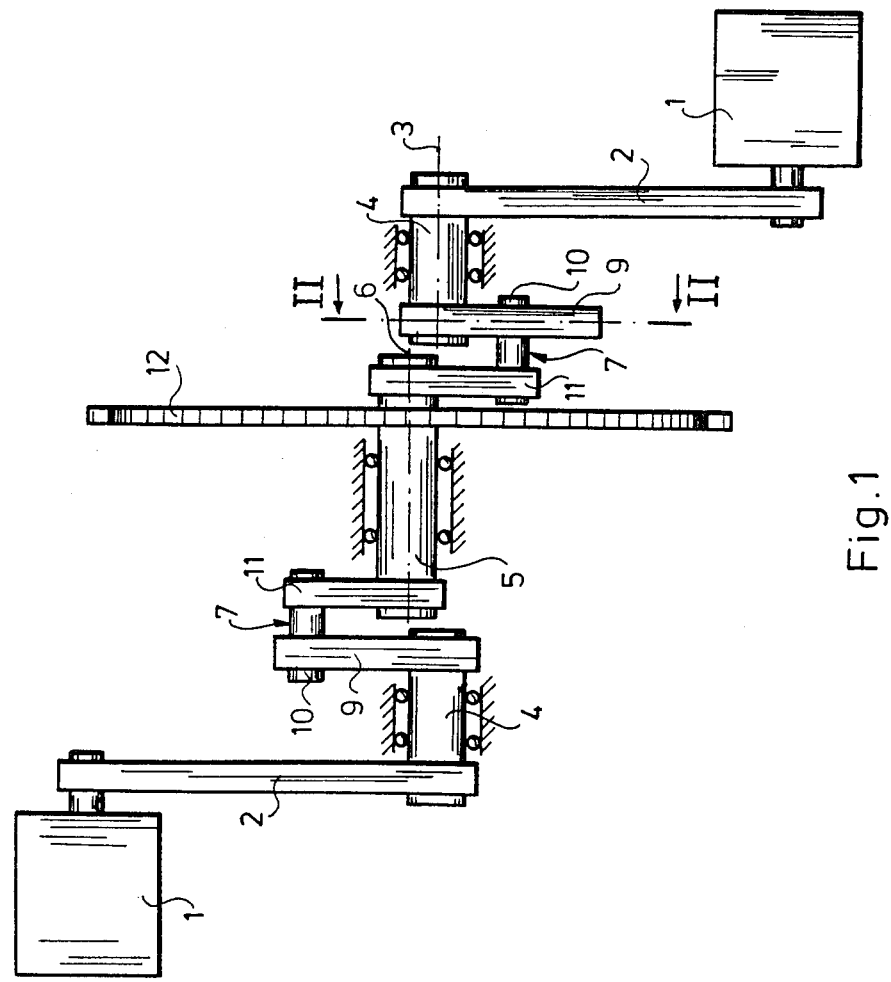
FIG. 1 is the schematic top view of a possible construction.

In case of the construction according to FIGS. 1 and 2, the 2 levers of pedals 1 are fixed to two separate shafts 4 which have common geometrical axis 3. The axis 6 of the driving shaft 5 is horizontally eccentric to the axis 3. The mechanical connection between the shafts 4 and the driving shaft 5 is realised by the eccentrics 7. These consists of the levers 9 fixed to the shafts 4 and the levers II fixed to the shafts 5 and connected to the slots 8 of the levers 9 by the pins 10. The shaft 5 drives the wheel of the bicycle with the help of the chain-wheel 12.

Figure 3:
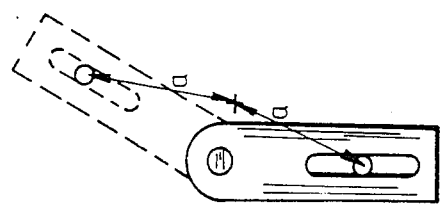
FIG. 3 illustrates four characteristic positions of the constructrion in FIGS. 1 and 2.
Figure 3:
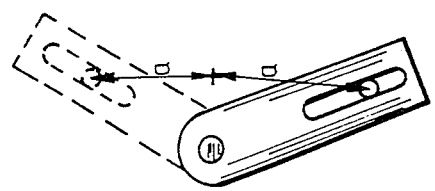
Figure 3:
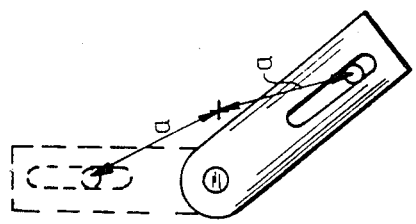
Figure 3:
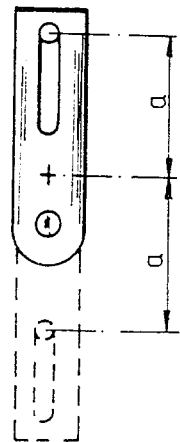

The characteristic phases of the construction in FIGS. 1 and 2 are shown in FIG. 3. For the sake of simplicity, only the positions of the levers 9 and pins 10 are illustrated. The rear lever 9 is plotted with dotted lines, because it cannot be seen behind the chain-wheel 12.

A basic position is shown in FIG. 3-I, where both levers (and the pedals accordingly) are in horizontal position. This is the optimal position during the motion of the gear, because the front pedal operates the chain-wheel on the longest arm. The rear pedal is only drivn by the force depressing the first one.

In the phase in FIG. 3-II the front pedal has been pushed down and the rear pedal (and lever) has completed a quarter of a circle. As the front one of the pins fixed to the chain-wheel 12 is farther from the axis of the pedal levers than the rear one, the rear lever moves faster than the front one. That is why in the phase in FIG. 3-II the rear lever has already covered a quarter of a circle while the front one has moved much less.

In the phase in FIG. 3-III the front and rear levers are symmetrical to the line connecting the axis of the levers and that of the driving shaft. This Figure demonstrates that this gear has positions when the depressing of each of the pedals results in an effective forward drive.

In the phase in FIG. 3-IV the rear lever is still ahead, though from the phase 3-III on the front lever moves faster.

As the figures demonstrate it, the eccentric shafts and the eccentrics eliminate the dead points of the gear, what is more, there are phases when the gear can be driven by both pedals simultaneously.

Figures 4, 5:
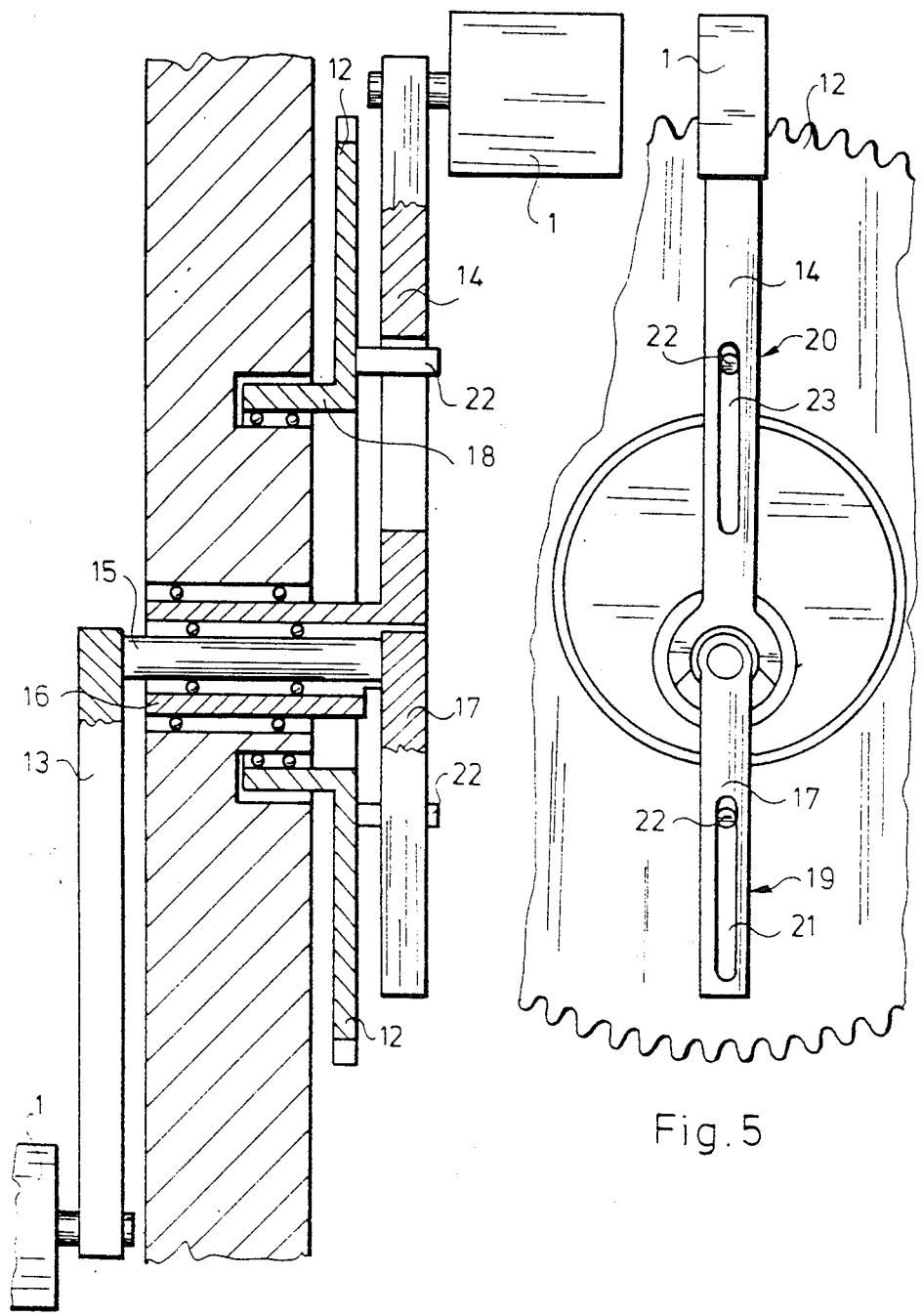
FIG. 4 is the schematic side view of an other construction of the drive, partly in section
FIG. 5 is part of the side-view of the same construction as in FIG. 4.

In the case of the construction according to FIGS. 4 and 5, the pedal levers 13,14 are fixed to the coaxial shafts 15,16. The inner shaft 15 of the lever 13 is led through the tubular shaft 16 to the side of the lever 14, where the lever 17 is fixed to it. The cut on the tubular shaft 16 and the fastening of the lever 17 to the shaft 15 is shaped so that the levers 13,14 can move in the necessary angle according to one another. In the case of this construction, the driving shaft 18 is a tubular shaft and is supported in such a way, that the shafts 15,16 are inside it. The axis 6 of the driving shaft 18 and the axis 3 of the shafts 15,16 are horizontally eccentric member. The mechanical connection between the driving shaft 18 and shafts 15,16 is realised by the eccentric members 19,20. The eccentric member 19 consists of the lever 17 with the slot 21 and the pin 22 which is fixed to the driving shaft 18 and butts into the slot 21. The eccentric member 20 consists of the lever 14 with the slot 23 and the pin 22 which is fixed to the driving shaft 18 and butts into the slot 23. The driving shaft 18 drives the wheel of the bicycle with the help of the chain-wheel 12.

Figure 6:
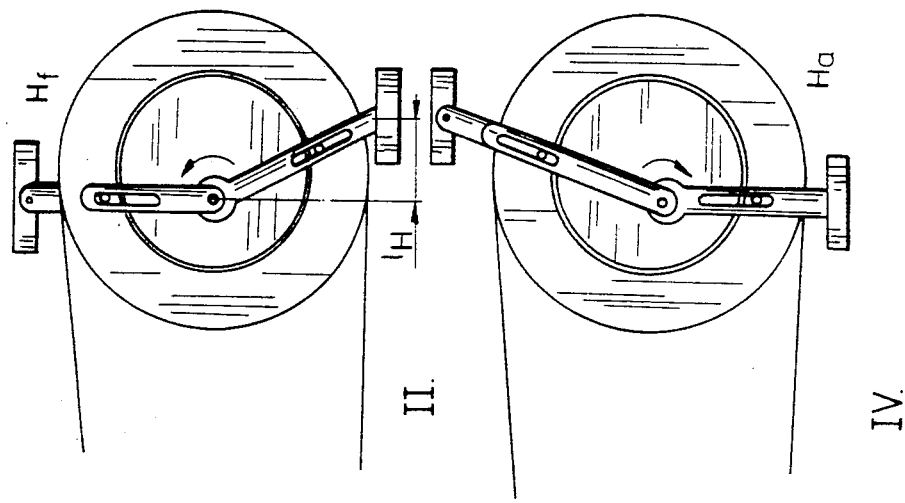
FIG. 6 illustrates four phases of the movement of the construction in FIGS. 4 and 5.
Figure 6:
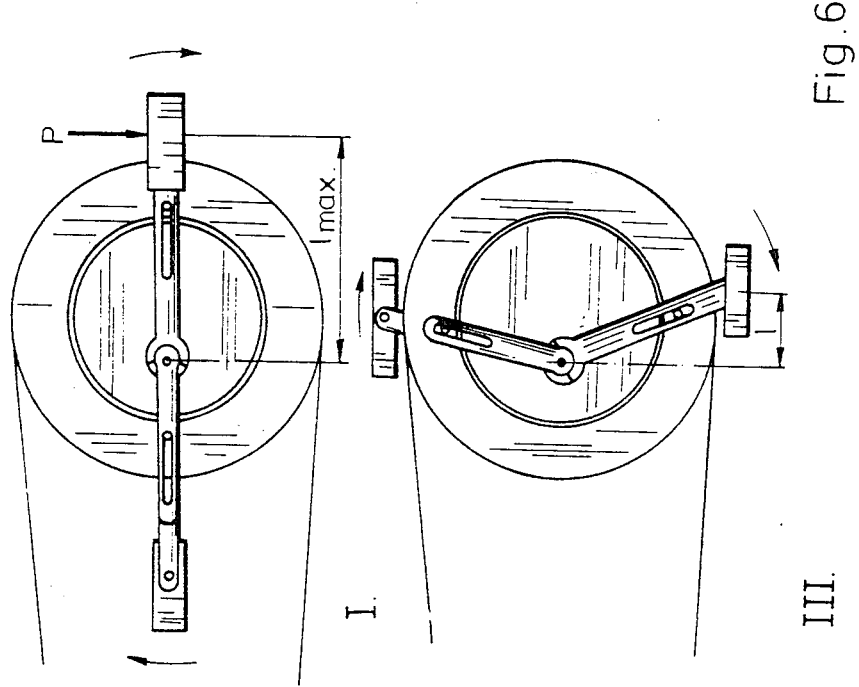

A simplified sketch of the construction of FIGS. 4 and 5 is shown in various characteristic phases of the movement of FIG. 6. The phases are identical to those of FIG. 3. For better understanding, however, the pedals 13,14 and the chain-wheel 12 are also indicated too.

The levers and the pedals are in horizontal position on FIG. 6-I. The Figure indicates the I arm of the P force driving the pedal.

The upper dead point of the rear pedal is illustrated in FIG. 6-II. The force depressing the pedal has no tangential component, so it cannot drive the chain-wheel. In a conventional driving gear the front pedal is in the lower dead point in this phase, so the driving can only continue after the pedals have moved out of the dead point. In the invented gear the force pushing the front pedal still operates on $I_H$ arm.

The pedals are in a symmetrical position in FIG. 6-III. In this position the depressing of each of the pedals results in forward drive.

In FIG. 6-IV the front pedal is in the lower dead point. In this phase the arm of the force depressing the rear pedal is equal to that in FIG. 6-II.

As the examples illustrate, the invented driving gear eliminates the simultaneous dead points of the pedals and accelerates the movement of the pedal when it is not depressed. By this means the effective stages of the pedals get nearer to one another, or they can even overlap.

Naturally the above constructions are only examples. The invention can be realized in many practical forms. It can be expedient for instance to make the distance between the axis of the pedal levers and that of the driving shaft adjustable. This would make the regulation of the maximum angle between the pedal levers and the overlap of the effective stages possible.

I claim:

1. A driving gear for vehicles, particularly for bycicles, comprising two pedals fixed to pedal levers rotating around a common axis and a driving shaft having an axis, the common axis of the pedal levers and the axis of the driving shaft being shifted with respect to each other and, eccentric members for connecting the pedal levers to the driving shaft, wherein the shaft of one pedal lever is coaxially arranged in a tubular shaft of the other pedal lever and allowing for a periodically changing angle between said levers, said driving shaft is tubular and the shafts of the pedal levers are arranged therein, one of the eccentric members comprising a lever having a slot therein, said lever being fixed to the shaft of the pedal levers and a pin fixed to the driving shaft and butted into said slot, the other of said eccentric members comprising a slot in said pedal lever and a pin fixed to the driving shaft and butted into said last-mentioned slot.

2. The driving gear as claimed in claim 1, wherein a chain wheel is fixed to the driving shaft.

3. The driving gear as claimed in claim 1, wherein the distance between the axis of the pedal levers and the axis of the driving shaft is adjustable.

* * * * *